Feb. 23, 1971 T. O. PAINE 3,566,396
ADMINISTRATOR OF THE NATIONAL AERONAUTICS
AND SPACE ADMINISTRATION
ANALOG SIGNAL INTEGRATION AND RECONSTRUCTION SYSTEM
Filed May 29, 1968 4 Sheets-Sheet 2
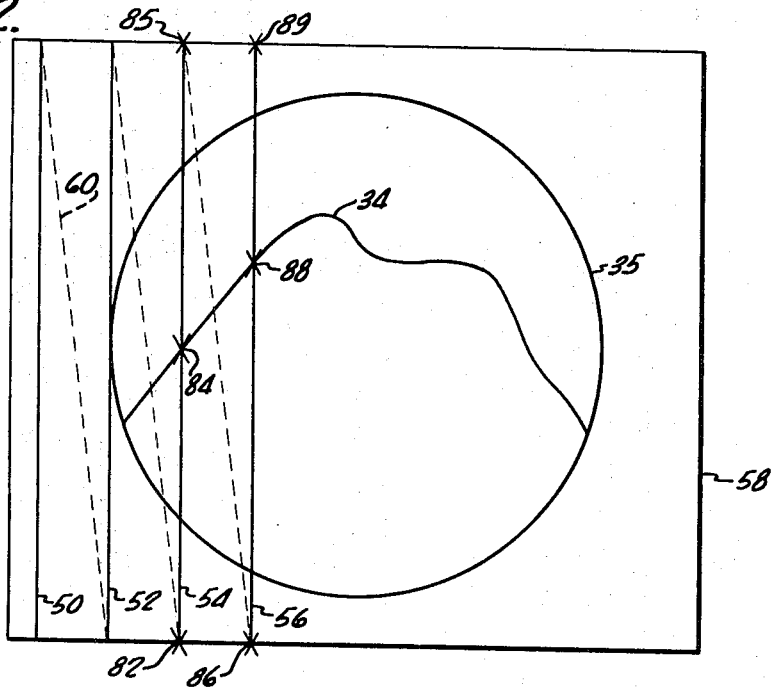
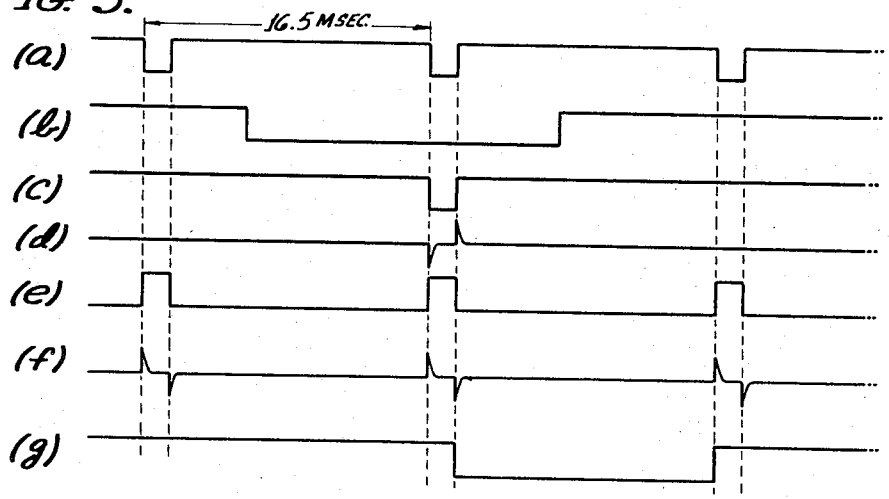
INVENTOR.
NAZEM A. HABBAL
ATTORNEYS.

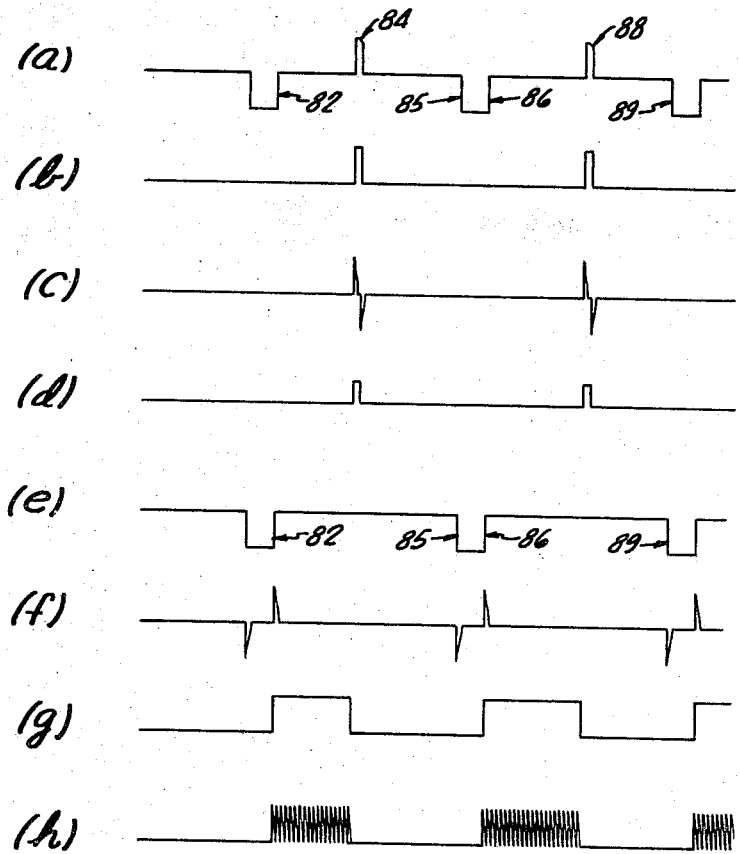

Feb. 23, 1971
T. O. PAINE
3,566,396
ADMINISTRATOR OF THE NATIONAL AERONAUTICS
AND SPACE ADMINISTRATION
ANALOG SIGNAL INTEGRATION AND RECONSTRUCTION SYSTEM
Filed May 29, 1968
4 Sheets-Sheet 4

INVENTOR.
NAZEM A. HABBAL
BY
ATTORNEYS.

United States Patent Office 3,566,396
Patented Feb. 23, 1971

3,566,396
ANALOG SIGNAL INTEGRATION AND
RECONSTRUCTION SYSTEM
T. O. Paine, Administrator of the National Aeronautics and Space Administration, with respect to an invention of Nazem A. Habbal, Hollywood, Calif.
Filed May 29, 1968, Ser. No. 732,921
Int. Cl. H03k 13/20
U.S. Cl. 340—347        9 Claims

ABSTRACT OF THE DISCLOSURE

Transient data such as that relating to the radiant energy incident to a shock wave in a gas shock tube is converted to an analog signal and displayed on the screen of an oscilloscope. A video scanning means scans the amplitude axis of the displayed signal at predetermined intervals along the time axis of the signal and generates a first indicia when each scan is initiated and a second indicia when the scan intersects the displayed signal. A counting means initiates a count in response to the first indicia of each scan and terminates the count when the second indicia is generated. During the interval between scans the data in the counting means, a digital representation of the amplitude of the displayed signal at the position of the scan, is shifted into a computer memory for storage. The stored digital data may be used either to calculate the area beneath the displayed waveform or for subsequent reconstruction thereof.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

The present invention relates to data acquisition systems and more particularly to converting a displayed analog signal to digital values which are integrated for use in comparative evaluations. It has been used in a shock tube data acquisition system to determine the quantitative content of the radiant energy incident to a shock wave.

The convective and radiative heating rates of a gas simulating the atmosphere of a planet may be studied by obtaining measurements proportional to the equilibrium and nonequilibrium spectral radiation behind an incident shock wave within the gas. These measurements are helpful in the material design of planetary entry vehicles.

In these measurements a gas shock tube is filled with a gas having a composition and under a pressure determined by the planetary atmosphere which is being simulated. At one end of the shock tube a diaphragm having a scored center portion separates the atmosphere of the shock tube from a gas such as helium in a gas driver. The pressure of the gas in the gas driver is increased until the diaphragm separating the two gases ruptures creating shock waves which travel down the gas tube at speeds exceeding 40,000 feet per second. Energy is radiated behind the shock wave as it travels down the tube. A quartz lens positioned proximate a slit in the shock tube refracts this radiation, as it passes the slit, into several beams. Each beam is imaged on a monochromator which selects a narrow wave length interval of the incident light. A transducer is coupled to each monochromator and converts the energy in the incident light to an electrical signal which is amplified by a photomultiplier and displayed on a cathode ray oscilloscope.

The area under the displayed signal on the oscilloscope is proportional to the total radiance in watts per cubic centimeter contained in the gas at the particular frequency band displayed. To convert the area beneath the curve to a numerical representation to be used in further calculations the present state of the art photographs the displayed waveform with a Polaroid camera and calculates this area from the photograph manually. This method is extremely time consuming, limited in scope, susceptible to human error and in general, very inadequate.

OBJECTS AND SUMMARY OF THE INVENTION

The present invention provides a display means for displaying an analog signal. A scanning means having a scan axis extending in the direction of the amplitude axis of the displayed analog signal scans the displayed signal at predetermined intervals along the time axis of the display. The scanning means generates a first indicia at the beginning of each scan and a second indicia when the scan intersects the displayed waveform. A counting means is responsively coupled to the scanning means and begins to count when the first indicia is generated by the scanning means and terminates the count when the second indicia is generated. At the end of each particular scan the scanning means generates a third indicia which results in the transfer of the data contained in the counting means to a computer storage memory and the resetting of the counter for the next scan.

The present invention provides a rapid, accurate and inexpensive method of digitizing the amplitude of a displayed waveform at predetermined intervals. These digital representations may be shifted to a computer wherein they are employed to calculate the area beneath the displayed waveform by Simpson's or the Trapezoidal rule.

The present invention while of general utility also has specific application to the digitizing of one-shot, fast rise time analog signals representing the radiant energy incident to a shock wave in a gas shock tube.

BRIEF DESCRIPTION OF THE DRAWINGS

FIG. 2 is a pictorial representation of scanning lines scanning a displayed waveform.

FIG. 3 is a chart of waveforms at selected points from the schematic in FIG. 1.

FIG. 4 is a chart of waveforms at selected points from the schematic in FIG. 1.

DESCRIPTION OF THE PREFERRED EMBODIMENTS

Figure 1:
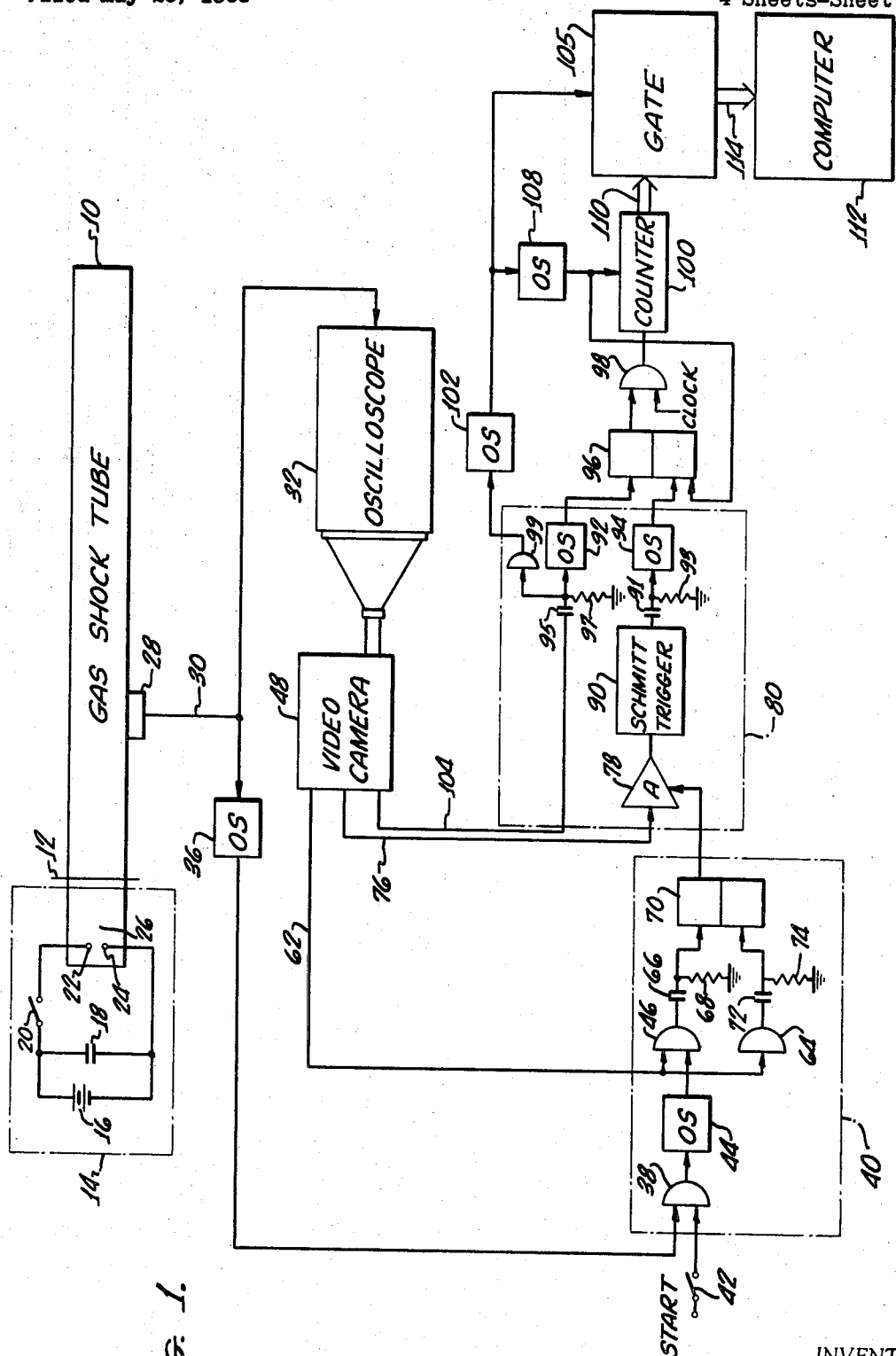
FIG. 1 is a schematic block diagram of a shock tube data acquisition system with which the present invention has been used.

In FIG. 1, there is shown a gas shock tube 10 having a diaphragm 12 separating the tube 10 from a gas driver 14. Gas drivers such as gas driver 14 are well known in the shock tube art and accordingly will not be discussed in detail. For purposes of discussion gas driver 14 is shown comprising an electrical energy source 16 which charges a capacitor 18 connected in parallel. In parallel connection with capacitor 18 is a series connected switch 20 and electrodes 22 and 24. When switch 20 is closed the energy contained in capacitor 18 will be discharged through the gap between electrodes 22 and 24. The electrodes 22 and 24 are contained within container 26. The atmosphere in container 26 may be helium gas, for example, under a pressure of 200 pounds per square inch. The atmosphere of container 26 is separated from the gas in shock tube 10 by diaphragm 12. Diaphragm 12 typically will have a scored center portion designed to rupture along the scored portion when the pressure differential between the gas in container 26 and tube 10 reaches a predetermined value. The closure of switch 20 transfers the energy contained in capacitor 18 to the atmosphere in container 26 increasing the pressure in the container 26 until diaphragm 12 ruptures. A shock wave is therefore created as the helium gas expands into the shock tube 10 dissipating its energy as it traverses the length of tube 10.

Gas shock tube 10 is typically 40 feet in length and has a 6 inch diameter. Chamber 26 may be an extension of shock tube 10 also having a 6 inch diameter and being approximately 9 inches in length. The speed at which the shock wave travels down the length of tube 10 varies depending upon the gas contained in tube 10, the gas in chamber 26 and the pressure differential at which diaphragm 12 ruptures and may exceed 40,000 feet per second.

Coincident with the travel of the shock wave down the length of tube 10 is a spectral radiation phenomena resulting from the exchange of energy between the gas in tube 10 and the expanding gas from container 26. The convective and radiative heating rate of the gas in tube 10, simulating the atmosphere of a particular planet, may be determined by measuring the equilibrium and nonequilibrium spectral radiation incident to the shock wave. This data has particular importance in the material design of planetary entry vehicles.

Sensing means 28 shown in FIG. 1 comprises a quartz lens (not shown) positioned near a slit in the tube 10. As the shock wave traverses the length of tube 10 passing proximate sensing means 28 the spectral radiation incident to the shock wave is refracted by the quartz lens into several frequency bands. Each frequency band refracted by the quartz lens is imaged upon a monochromator (not shown) which selects a particular wave length interval of the incident light. The sensing means 28 also includes a plurality of transducers each coupled to a particular monochromator for converting the energy contained in that particular frequency band to an electrical signal. A photomultiplier (not shown) is associated with each transducer and amplifies that signal. The arrangement shown in FIG. 1 provides a means for converting the analog signal output from sensing means 28 on line 30, representing the radiation energy of a particular frequency band, to a digital representation.

The analog signal on line 30 is connected as an input to a display means comprising cathode ray oscilloscope 32. In FIG. 2 there is shown a pictorial representation of a waveform 34 as it would appear on the screen of oscilloscope 32.

The analog signal appearing on line 30 is also an input to a one-shot multivibrator 36. The output from one-shot 36 will become true for a predetermined period of time when the signal appears on line 30. The output of one-shot 36 is connected as an input to AND gate 38 in field isolation circuit 40. Start switch 42 has one terminal connected to a voltage potential and a second terminal connected as a second input to AND gate 38. Actuation of start switch 42 applies a true input to gate 38 and also actuates switch 20 in the gas driver 14 previously discussed. Accordingly, a fraction of a second following actuation of switch 42 an analog signal will appear on line 30 causing one-shot 36 to become true. The output of AND gate 38 is true when both of its inputs are true. The output of AND gate 38 is connected as an input to one-shot 44. One-shot 44 will have a true output, as shown in FIG. 3(b), for a predetermined period of time following the true input applied from AND gate 38. The output of one-shot 44 is an input to AND gate 46. A second input to AND gate 46 is generated by video camera 48 on line 62.

Video camera 48 is disposed in optical communication with the display screen of the oscilloscope 32 and has a scanning axis extending in the same direction as the amplitude axis of the displayed waveform. Accordingly, camera 48 must be positioned so that its normally horizontal scan lines are vertical with respect to the display screen.

Referring now to FIG. 2 there is shown a display screen 35 of oscilloscope 32 having a displayed waveform 34. A video raster, partially shown by scanning lines 50, 52, 54 and 56, represents the action of the scanning means of camera 48 and is shown having a scanning axis extending in the direction of the amplitude axis of the displayed waveform 34. The scanning field for the scanning means is represented by the rectangular outline 58. Video camera 48 will have approximately 262 scanning lines, such as scanning line 50, for each scanning field. Scanning line 52 is the second scan line in the field and occurs at a predetermined interval from scan line 50. In a standard video camera, scan line 50 will traverse the vertical distance of the field in approximately 53 microseconds and return by dotted path 60 to begin scan line 52 in approximately 10 microseconds. The period of time represented by line 60 is normally called the horizontal blanking period. Once all 262 scan lines have been traced and the extreme right hand side of field 58 is reached, the scanning means will return to the left hand side to begin scanning a second field. The period of time required for the scanning means to return from the right hand side of the field 58 to the left hand side is normally referred to as the vertical blanking time.

In the present discussion since the horizontal scanning lines 50, etc. are oriented to scan vertically these lines will be referred to hereinafter as the vertical scanning lines. The blanking interval between scanning lines will be referred to as the vertical blanking time and the normal vertical blanking time which returns the scan from the right hand side to the left hand side of the field 58 will be referred to as the horizontal blanking time.

Referring again to FIG. 1, video camera 48 has an output on line 62 connected as an input to AND gate 46 and to inverter 64. The signal appearing on line 62 is the horizontal blanking signal from camera 48. FIG. 3(a) is a graph showing three horizontal blanking pulses from camera 48. During the interval between horizontal pulses, camera 48 will scan one scanning field comprising 262 scan lines. The horizontal blanking signal from camera 48, FIG. 3(a), and the output of one-shot 44, FIG. 3(b), are ANDed by AND gate 46 which has an output as shown in FIG. 3(c). The output of AND gate 46 is connected as a one-set input to flip-flop 70 through a differentiating network comprising capacitor 66 and resistor 68. FIG. 3(d) shows the differentiation of the output of AND gate 46 by the differentiating network. Flip-flop 70 will be one-set by a positive going pulse from the differentiating network. Accordingly, it can be seen that the output of one-shot 44 must remain true for one complete scanning cycle of camera 48 to insure that one horizontal pulse from camera 48 will occur while one-shot 44 is true.

The output of flip-flop 70 is shown in FIG. 3(g). Flip-flop 70 is one-set by the positive pulse from the differentiating network, that is, on the trailing edge of the output from AND gate 46. The trailing edge of the output from AND gate 46 is coincident with the trailing edge of the horizontal blanking signal on line 62 from camera 48. Flip-flop 70 then is one-set at the end of the horizontal blanking period when one-shot 44 is true.

The horizontal blanking pulses on line 62 are inverted by inverter 64 and connected as a reset input to flip-flop 70 through a differentiating network comprising capacitor 72 and resistor 74. FIG. 3(e) is a representation of the output from inverter 64. FIG. 3(f) shows the differentiation of the output from inverter 64 by the capacitor 72 and resistor 74. Flip-flop 70 will be reset by a positive going pulse from the differentiating network. It can be seen then that flip-flop 70 will be reset on the leading edge of each horizontal blanking pulse from camera 48. Accordingly, the output of flip-flop 70 will be set true on the trailing edge of the first horizontal blanking pulse to occur after one-shot 44 has been set true and will be reset on the leading edge of the next horizontal blanking pulse.

A second output from camera 48 on line 76 is connected as an input to amplifier 78 in control circuit 80. The signal on line 76 is the composite video and vertical blanking pulse signal from camera 48. FIG. 4(a) is a representation of the signal on line 76 as it would appear for the scanning lines 54 and 56 in FIG. 2. The negative pulses, in FIG. 4(a), are the vertical blanking pulses and the positive pulses are the video indicia.

In a standard video camera, the vertical blanking pulses shown in FIG. 4(a) will occur every 63.5 microseconds whereas the horizontal blanking pulses shown in FIG. 3(a) will occur every 16.5 milliseconds. That is, approximately 262 vertical blanking pulses, or one full scanning field, will occur during the interval between the horizontal blanking pulses of FIG. 3(a).

Camera 48 generates a third signal output which appears on line 104 and which is connected to a differentiating network comprising capacitor 95 and resistor 97 in the control circuit 80 in FIG. 1. This signal is the vertical blanking signal and is shown in FIG. 4(e). The vertical blanking pulses in FIGS. 4(a) and 4(e) are generated at the same time by camera 48.

The scanning lines seen in FIG. 2 are initiated when the trailing edge of each vertical blanking pulse occurs and are terminated when the leading edge occurs. For example, scan line 54 is initiated at point 82 in FIG. 2 when the trailing edge, designated point 82, of the first vertical blanking pulse in FIGS. 4(a) and 4(e) occurs and is terminated when the leading edge, designated point 85, of the next blanking pulse occurs. The positive pulse designated 84 in FIG. 4(a) is the indicia generated by camera 48 when scan line 54 intersects the displayed waveform 34. Similarly, point 86 in FIGS. 4(a) and 4(e) represents the indicia generated by camera 48 corresponding to the initiation of scan line 56. Point 88 in FIG. 4(a) represents the indicia generated by camera 48 when scan line 56 intersects waveform 34 and point 89, in FIGS. 4(a) and 4(e), is the indicia which is generated by camera 48 indicating the termination of scan line 56.

The signal on line 76 is amplified by amplifier 78 and applied as an input to Schmitt trigger 90. The true output of flip-flop 70 is connected as an enabling input to amplifier 78. Amplifier 78, therefore, will amplify the signal on line 76 only during the first full scanning field of camera 48 following the occurrence of the shock wave in tube 10.

Schmitt trigger 90 only responds to the video pulses amplified by amplifier 78, such as pulses 84 and 88 in FIG. 4(a), and will have a square pulse output as shown in FIG. 4(b) for each video pulse input. The output of Schmitt trigger 90 is differentiated by a differentiation network comprising capacitor 91 and resistor 93, as shown in FIG. 4(c), and is applied as an input to one-shot 94. One-shot 94 is designed to have a true output for a predetermined period of time following a positive pulse input from the differentiating network as seen in FIG. 4(d). One-shot 94 is included in control circuit 80 to provide a power gain stage between Schmitt trigger 90 and the remaining logic in the circuit. The output of one-shot 94 is a reset input to flip-flop 96.

The vertical blanking pulses appearing on line 104, FIG. 4(e), are differentiated by a differentiating network comprising capacitor 95 and resistor 97, as shown in FIG. 4(f) and are connected to one-shot 92 and inverter 99. One-shot 92 is designed to generate a true output for a predetermined period of time following a positive pulse input from the differentiation network. The output of one-shot 92 is connected as a one-set input to flip-flop 96.

The true output of flip-flop 96 is shown in FIG. 4(g). Flip-flop 96 will become set, or true, when the output of one-shot 92 becomes true and will be reset, or false, when the output of one-shot 94 becomes true. The flip-flop 96, therefore, will be set true on the trailing edge of each vertical blanking pulse appearing on line 104 and reset when a video pulse appears on line 76. The period of time that flip-flop 96 is true is proportional to the amplitude of the displayed waveform 34.

The true output of flip-flop 96 is an input to AND gate 98. A second input to gate 98 is a clock input. In the preferred embodiment of the present invention the clock input to gate 98 has a frequency of 10 megacycles. The output of AND gate 98, as seen in FIG. 4(h), will follow the clock pulse input so long as flip-flop 96 is true, that is, AND gate 98 will have a 10 megacycle pulse output during the period of time between the initiation of a scan line and the intersection of the waveform 34 by the scan line as seen in FIG. 2.

The output of AND gate 98 is an input to a counting means comprising counter 100. Counter 100 includes a series of flip-flops (not shown) interconnected as a binary counter. Counter 100 will advance in response to each clock pulse input from AND gate 98. The number of flip-flops employed in counter 100 is dependent upon the frequency of the clock input to gate 98 and the expected length of time during which AND gate 98 will be enabled by flip-flop 96. In the preferred embodiment of the present invention 13 flip-flops were found to be sufficient. If the clock frequency is increased to increase the resolution of the counting by counter 100, the number of flip-flops must also be increased.

Inverter 99, FIG. 1, inverts the signal from the differentiating network comprising capacitor 95 and resistor 97 and has an output which is the inverse of that shown in FIG. 4(f). The output of inverter 99 is an input to one-shot 102. One-shot 102 is designed to have a true output for a predetermined period of time, for example 2 microseconds, following a positive pulse input. Recall that, as shown in FIG. 2, a vertical blanking pulse will occur between the termination of a scan and the initiation of the following scan. Accordingly, one-shot 102 will be one-set for a predetermined period of time by the leading edge of each vertical blanking pulse generated by camera 48. The output of one-shot 102 is an input to gate 105 and one-shot 108. The outputs of the flip-flops contained in counter 100 are connected in parallel to gate 105 as shown by double shafted arrow 110. These flip-flop outputs will be connected as inputs to computer 112, shown by double shafted arrow 114, when one-shot 102 is true as an input to gate 105.

One-shot 108 will be set true for a predetermined period of time, for example two microseconds, following the return of the output of one-shot 102 to its normal state. The output of one-shot 108 is a reset input to the flip-flops contained in counter 100 and to flip-flop 96. When a vertical blanking pulse occurs on line 104 from camera 48, then, one-shot 102 will be set true for two microseconds on the leading edge of the pulse thereby enabling the data contained in counter 100 to be copied by computer 112. When the one-shot 102 returns to its normal state, one-shot 108 is trigged on resetting the flip-flops in counter 100. The counter 100 therefore is reset to an initial value during the vertical blanking period between each scan line.

In summary, start switch 42 is actuated enabling AND gate 38 and closing switch 20 in gas driver 14. A shock wave is initiated which travels down shock tube 10. A signal appears on line 30 as the shock wave passes adjacent sensing means 28 and is traced on the display screen of oscilloscope 32. The signal also sets one-shot 36 true resulting in a true output from AND gate 38. One-shot 44 is set true by AND gate 38 and enables AND gate 46. The first horizontal blanking pulse from camera 48 following the detection of the shock wave is reproduced by gate 46 and is differentiated to one-set flip-flop 70. Flip-flop 70 will remain true during the entire scanning field enabling amplifier 78. Field isolation circuit 40 insures that circuit 80 will enable AND gate 98 only during the first full scanning field following the shock wave. At the initiation of each scan during this field, flip-flop 96 is set true and is reset false when the scan intersects the displayed waveform on the oscilloscope 32. The true output of flip-flop 96 is therefore a pulse which is initiated when the first indicia is generated by scanning means 48, indicating the initiation of a scan line, and which is terminated when the second indicia is generated, indicating the intersection of the scan line and the displayed waveform. The duration of the pulse from flip-flop 96 is therefore proportional to the amplitude of the waveform 34 at the point of the particular scan. AND gate 98 applies a clock input to counter 100 during this interval. The data contained in counter 100 is shifted through gate 105 to computer 112 at the termination of each scan. Once this data shift has been completed the counter 100 is reset.

The data shifted from counter 100 to computer 112 is a digital representation of the amplitude of the displayed waveform 34 on the display screen of oscilloscope 32. At the end of the first scan field of camera 48 following the occurrence of the shock wave, the computer 112 will contain digitized values of the amplitude of the displayed waveform at predetermined intervals along the time axis of the waveform. Since the ordinate Y, the amplitude of the waveform, is known for every ΔX interval, the interval between scanning lines, computer 112 can calculate the area beneath the displayed waveform by application of Simpson's or the Trapezoidal rule.

Note, in FIG. 2, that there may be scan lines in the scanning field, such as line 50, which do not intersect the displayed waveform 34. Accordingly, at the end of such a scan line, counter 100 will contain a value, the maximum value possible, which is shifted to computer 112. These values, which do not represent actual points on the waveform, are easily identified and eliminated during data reduction. Flip-flop 96 will have no reset input from one-shot 94 in the event that a scan line does not intersect the waveform 34. However, when one-shot 108 is set true to reset the flip-flops in counter 100 the flip-flop 96 will also be reset.

It should also be observed that each count shifted from counter 100 to computer 112, representing the digital value of the time elapsed between the initiation of a particular scan and the intersection of the scan with the waveform, includes a value representing the time elapsed between the initiation of the scan and the point where the scan line actually enters the area beneath the waveform. This latter value is not desired in the computer calculation and may also be easily compensated for during data reduction.

The present invention is suited to digitize waveforms which are displayed in any manner. For example, a photograph of a waveform, or a graphical reproduction of a waveform by an X-Y plotter may be substituted for the oscilloscope 32. The only restriction is that the displayed waveform must be present long enough for one full scanning field of scanning means of camera 48 to occur. Advantageously, the persistence of a waveform traced on the display screen of a standard oscilloscope is approximately 50 milliseconds which is satisfactory for use with a standard video camera which completes one full scanning field in 16.5 milliseconds.

Recall that the radiant energy of particular frequency bands in the spectrum of the radiation incident to a shock wave traveling down shock tube 10 may be calculated by refracting the radiation into frequency bands by a quartz lens proximate a slit in tube 10. The energy contained in each frequency band may then be converted to an electrical signal which is displayed on a display means and digitized by the previously discussed technique.

Figure 5:
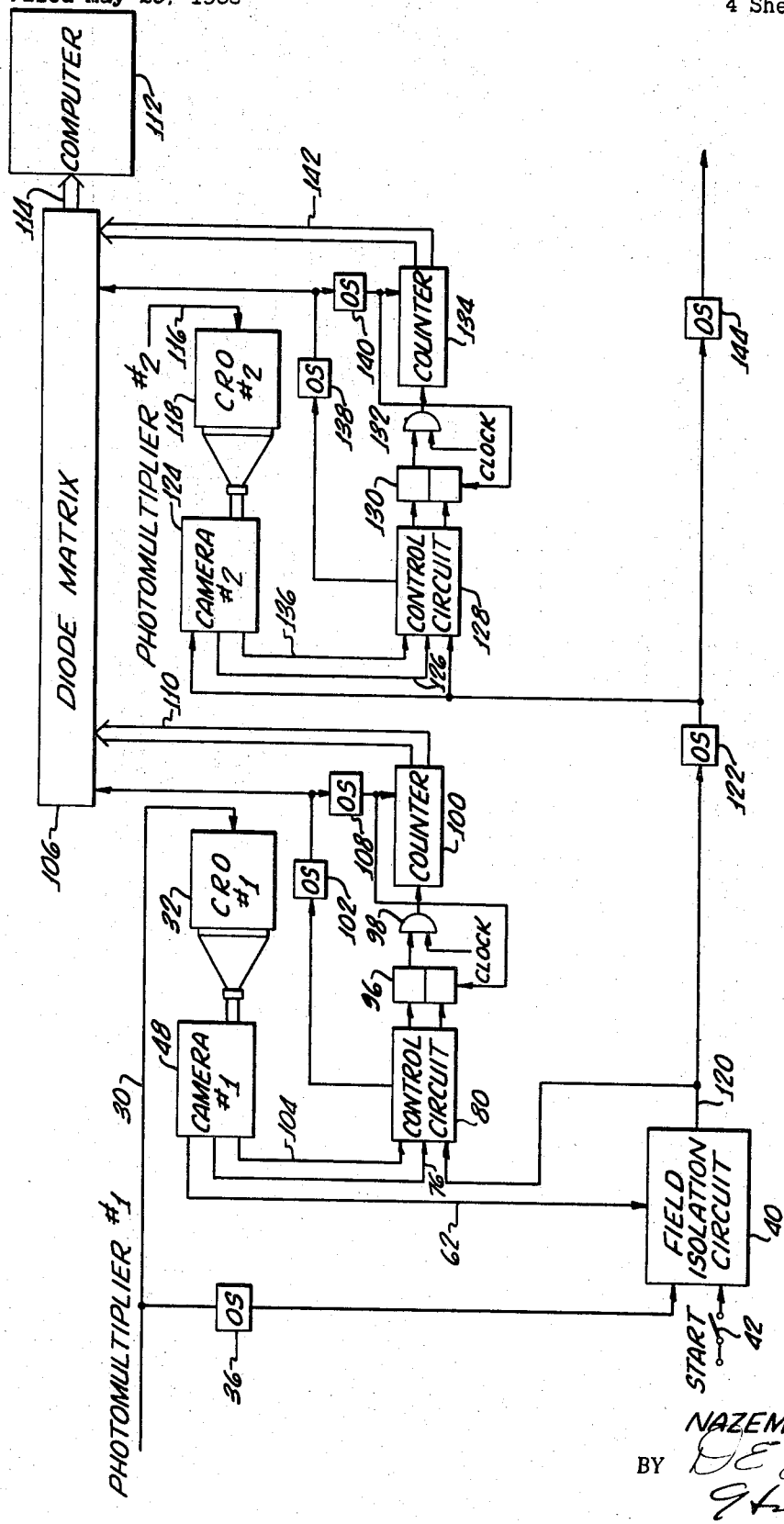
FIG. 5 is a block diagram of a system for converting a plurality of displayed waveforms to digital representations.

Referring now to FIG. 5 there is shown a system comprising two subsystems for digitizing two simultaneously occurring waveforms such as two signals representing the energy in two frequency bands of the refracted radiation. Each subsystem is shown in block diagram form and conforms substantially to the preceding discussion associated with FIGS. 1 through 4.

The actuation of start switch 42 initiates a shock wave in shock tube 10 resulting in a signal on line 30 which is displayed on display means 32 and which represents the energy in one frequency band. A signal on line 116 representing the energy contained in a second frequency band and which occurs simultaneously with the signal on line 30 is applied to display means 118.

Field isolation means 40 will generate a true output during the first full scanning field of camera 48 following the occurrence of the shock wave. The true output of isolation means 40 on line 120 enables circuit 80 which allows the counter 100 to respond to the video output from camera 48 on line 76. At the termination of each scan during the scanning field the contents of counter 100 are shifted through a diodematrix 106 to computer 112. The counter 100 is thereafter reset.

The second subsystem for digitizing the output from photomultiplier number 2 is synchronized with the operation of the first subsystem. The output on line 120 is connected as an input to one-shot 122. One-shot 122 will be set true for a predetermined period of time, for example 4 microseconds, when the output from isolation means 40 is true. One-shot 122 is connected as an input to the horizontal synchronization circuits of camera 124. Camera 124 will respond to the termination of the true output from one-shot 122 by initiating a scanning field. Accordingly, camera 124 will begin to scan the displayed waveform on oscilloscope 118, 4 microseconds after camera 48 initiates its scanning field.

The video output from camera 124 on line 126 is an input to circuit 128. Circuit 128 corresponds in structure and function to circuit 80 as previously discussed. The output of one-shot 122 is also an input to circuit 128 and serves the same function as the field isolation circuit 40 does for circuit 80. Circuit 128 will set flip-flop 130 as each scan in the scanning field is initiated and reset the flip-flop 130 as each scan intersects the displayed waveform on oscilloscope 118. The true output of flip-flop 130 enables AND gate 132. AND gate 132 is an input to counter 134 and will have an output which follows the clock pulse input to gate 132 so long as flip-flop 130 is true. At the end of each scanning line of camera 124 a vertical blanking pulse will appear on line 136 as an input to control circuit 128. Control circuit 128 will set one-shot 138 true for a predetermined period of time on the leading edge of each vertical blanking pulse appearing on line 136. During the true state of one-shot 138 the data contained in counter 134 will be connected in parallel to computer 112 via lines 142 and 114. When one-shot 138 returns to its normal state one-shot 140 will become one-set for a predetermined period of time resetting the flip-flops in counter 134.

By delaying the initiation of the scanning field for the second subsystem by 4 microseconds, it can be seen that the first scan line for the first subsystem will be completed and the data shifted from counter 100 to computer 112 by the time the data in the second subsystem contained in counter 134 is ready to be shifted to computer 112. The subsystems being thus synchronized only one diodematrix is required for shifting data from the various counters to computer 112.

A third subsystem may be added to the system by delaying the initiation of the scanning field for that subsystem by 4 microseconds following the initiation of the scanning field for the second subsystem. This delay is provided by one-shot 144. Additional subsystems may be added to the system by cascading them in a like manner.

It has been pointed out that the digital data stored in the computer following scanning of the displayed waveform, can be utilized, with suitable programming, to calculate the area under the waveform which is the total value of the radiant energy represented by the displayed waveform. It is also feasible to utilize the same stored data to reconstruct and display a visual image which corresponds to the original displayed waveform. Such reconstruction would result in a virtually true reproduction of the original waveform and could be used for study in the same manner as a photographic copy made at the time of the original display.

Although the preceding discussion was directed specifically to showing how the present invention could be applied to the digitization of an analog signal obtained from a gas shock tube, it should be apparent that it has general application for converting any analog signal to a digital representation. In particular, the present invention provides a means of digitizing one-shot analog signals having a fast rise time.

What is claimed is:

1. An apparatus for digitizing the amplitude of an analog signal at predetermined intervals comprising:
    an electron beam deflection means responsive to said analog signal and having a display screen for displaying said analog signal;
    scanning means including a camera tube disposed in optical communication with said display screen having a scanning axis extending in the direction of the amplitude axis of said displayed analog signal for scanning said display screen at predetermined intervals along the time axis of said displayed signal, said scanning means generating a first indicia when each scan is initiated, a second indicia when said scan intersects said displayed signal and a third indicia at the end of each scan;
    counting means responsively coupled to said scanning means;
    means for initiating a count when said scanning means generates said first indicia;
    means for terminating said count when said second indicia is generated; and
    storage means responsively coupled to said counting means and said scanning means for storing the digital representation contained in said counting means when said scanning means generates said third indicia.

2. An apparatus for determining the energy content of a high speed, one-shot signal, comprising:
    an electron beam deflection means responsive to said analog signal and having a screen for displaying said analog signal as a waveform;
    scanning means including a camera tube disposed in optical communication with said display screen and having a scanning a scanning axis parallel to the amplitude axis of the displayed waveform for scanning the display screen at predetermined intervals along the time axis of the displayed waveform, said scanning means generating a first indicia when each scan is initiated;
    means for generating a second indicia when said scan intersects said displayed waveform;
    counting means responsively coupled to both of said means;
    means for initiating a count when said scanning means generates said first indicia;
    means for terminating said count when said second indicia is generated;
    means for storing sequential count data as generated; and,
    integrating means for summing the stored data to obtain a value which represents the energy content of the signal.

3. An analog to digital conversion system for use with a gas shock tube wherein energy is radiated incident to a shock wave comprising:
    display means for displaying a plurality of simultaneously occurring analog signals each said signal being proportional to the energy contained in a particular frequency band of the radiant energy incident to said shock wave;
    a plurality of scanning means, each in optical communication with a particular displayed signal and having a raster scanning axis extending in the direction of the amplitude axis of said displayed signal, for scanning said said signal at predetermined intervals along the time axis of said signal with successive scanning lines, said scanning means generating indicia having a temporal relationship representative of the amplitude of said analog signal at said predetermined intervals, said scanning by each scanning means being initiated in a predetermined sequence to have all scanning means complete a first scanning line sequentially before any scanning means initiates a second scanning line; and,
    a plurality of digitizing means each responsively coupled to a particular scanning means for providing a digital representation of said indicia generated by said scanning means for each scanning line.

4. The apparatus as described in claim 3 further including storage means coupled to said plurality of digitizing means and to said plurality of scanning means for storing said digital representations sequentially in the order that said scanning means complete each scanning line.

5. A system for accumulating data corresponding to the amount of spectral radiation, at preselected wavelengths, that is produced by a shock wave created in a controllable shock tube facility, said system comprising:
    sensing means for providing an analog signal representative of the energy level of said spectral radiation;
    display means for providing a transient two-dimensional graphic display of said analog signal, said graphic display depicting a plot of said energy level as a function of time, units of energy level and time being respectively measured along an amplitude axis and a time axis orthogonal thereto;
    camera means, disposed in optical communication with said graphic display and having a raster including scanning lines extending parallel to said amplitude axis, for providing video signals corresponding to said graphic display and raster signals representing the commencement and termination of each of said scanning lines;
    quantizing means, responsive to said video signals and said raster signals for providing digital signals corresponding to said units of energy level as a function of time; and
    storage means for providing a permanent record of said digital signals.

6. The system defined by claim 5 further including switching means for simultaneously energizing said quantizing means and creating said shock wave.

7. The system defined by claim 5 wherein said quantizing means includes:
    a digial counter for generating said digital signals;
    means for initiating operation of said digital counter in response to raster signals representing the commencement of succesive scanning lines; and
    means for terminating operation of said digital counter in response to said video signals.

8. The system defined by claim 7 further including transfer means for sequentially applying said digital signals to said storage means in response to said raster signals representing the termination of successive scanning lines.

9. The system defined by claim 8 further including switching means for simultaneously energizing said quantizing means and creating said shock waves.

References Cited
UNITED STATES PATENTS

| | | | |
|---|---|---|---|
| 3,165,730 | 1/1965 | Robinson | 340—347 |
| 3,204,235 | 8/1965 | DeRosa | 340—347 |
| 3,251,055 | 5/1966 | McIntosh | 250—219IA |
| 3,335,408 | 8/1967 | Oliver | 250—219IA |
| 3,441,722 | 9/1969 | Gloess | 250—219IA |

THOMAS A. ROBINSON, Primary Examiner

J. GLASSMAN, Assistant Examiner

U.S. Cl. X.R.

250—219